United States Patent
Adams et al.

(10) Patent No.: US 7,607,692 B2
(45) Date of Patent: Oct. 27, 2009

(54) AUTOMOBILE BALLAST DEVICE

(76) Inventors: Edie A. Adams, 419 S. Harley St., Tiffin, OH (US) 44883; Caren M. Wiersema, 419 S. Harley St., Tiffin, OH (US) 44883

( * ) Notice: Subject to any disclaimer, the term of this patent is extended or adjusted under 35 U.S.C. 154(b) by 354 days.

(21) Appl. No.: 11/697,317

(22) Filed: Apr. 6, 2007

(65) Prior Publication Data

US 2008/0246262 A1  Oct. 9, 2008

(51) Int. Cl.
*B60R 9/00* (2006.01)

(52) U.S. Cl. .................. 280/759; 280/757; 280/758; 296/37.6; 220/9.4; 220/495.01; 220/495.05; 220/495.06

(58) Field of Classification Search ............ 280/757, 280/758, 759; 296/37.6; 220/9.4, 495.01, 220/495.05, 495.06
See application file for complete search history.

(56) References Cited

U.S. PATENT DOCUMENTS

| | | | |
|---|---|---|---|
| 4,902,038 A | 2/1990 | Grover | |
| 4,971,356 A | 11/1990 | Cook | |
| 5,330,227 A * | 7/1994 | Anderson | 280/759 |
| 5,568,890 A * | 10/1996 | Magee et al. | 224/539 |
| 5,597,193 A * | 1/1997 | Conner | 296/37.6 |
| 5,657,916 A * | 8/1997 | Tackett | 224/404 |
| 5,689,920 A * | 11/1997 | Hallsten | 52/169.1 |
| 5,897,138 A | 4/1999 | Hall | |
| 6,003,924 A * | 12/1999 | Nicol et al. | 296/37.6 |
| 6,027,139 A * | 2/2000 | Malinowski et al. | 280/759 |
| 6,217,103 B1 * | 4/2001 | Schultz et al. | 296/100.09 |
| 6,283,527 B1 | 9/2001 | Desmarais | |
| 6,302,464 B1 * | 10/2001 | Kubis et al. | 296/37.6 |
| 6,693,786 B2 * | 2/2004 | Petrenko | 361/144 |
| 7,159,902 B2 * | 1/2007 | Carty | 280/759 |
| 7,175,201 B2 * | 2/2007 | Childs et al. | 280/759 |
| 7,264,273 B2 * | 9/2007 | Ryan et al. | 280/759 |
| 2002/0101069 A1 * | 8/2002 | Dombey | 280/759 |
| 2002/0145277 A1 * | 10/2002 | Dombey | 280/759 |
| 2003/0047928 A1 | 3/2003 | Gosselin | |
| 2004/0119274 A1 * | 6/2004 | Carty | 280/759 |
| 2006/0220366 A1 * | 10/2006 | Childs et al. | 280/759 |
| 2006/0244279 A1 * | 11/2006 | Ranka et al. | 296/37.6 |
| 2007/0046011 A1 * | 3/2007 | Bovy | 280/759 |
| 2007/0284865 A1 * | 12/2007 | Watkins | 280/759 |
| 2008/0100080 A1 * | 5/2008 | Hyndman | 296/37.6 |
| 2008/0197614 A1 * | 8/2008 | Connors et al. | 280/759 |
| 2008/0197615 A1 * | 8/2008 | Connolly | 280/759 |

* cited by examiner

*Primary Examiner*—Christopher Ellis
*Assistant Examiner*—Barry Gooden, Jr.
(74) *Attorney, Agent, or Firm*—Dale J. Ream

(57) ABSTRACT

An automobile ballast device includes a bladder member configured to hold various amounts of matter and having an inlet for selectively allowing the matter to enter the bladder member. The automobile ballast device further includes a plurality of lower panels configured to collectively form a unitary platform below the bladder member, each lower panel having an interlocking member complementary to an interlocking member of another respective lower panel. Similarly, the automobile ballast device includes a plurality of upper panels configured to collectively form a unitary platform atop the bladder member, each upper panel having an interlocking member complementary to an interlocking member of another respective upper panel. The ballast device also includes a plurality of spacers, each spacer being coupled to respective lower upper panels for maintaining a selected distance therebetween. Each spacer includes indicia indicative of a volume or weight of ballast matter.

20 Claims, 5 Drawing Sheets

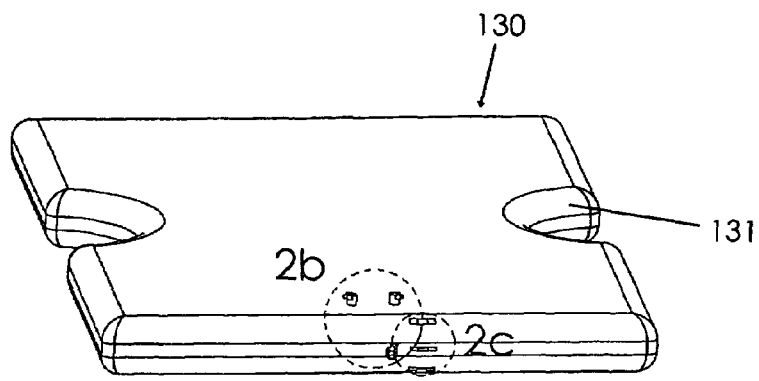
Fig. 2a
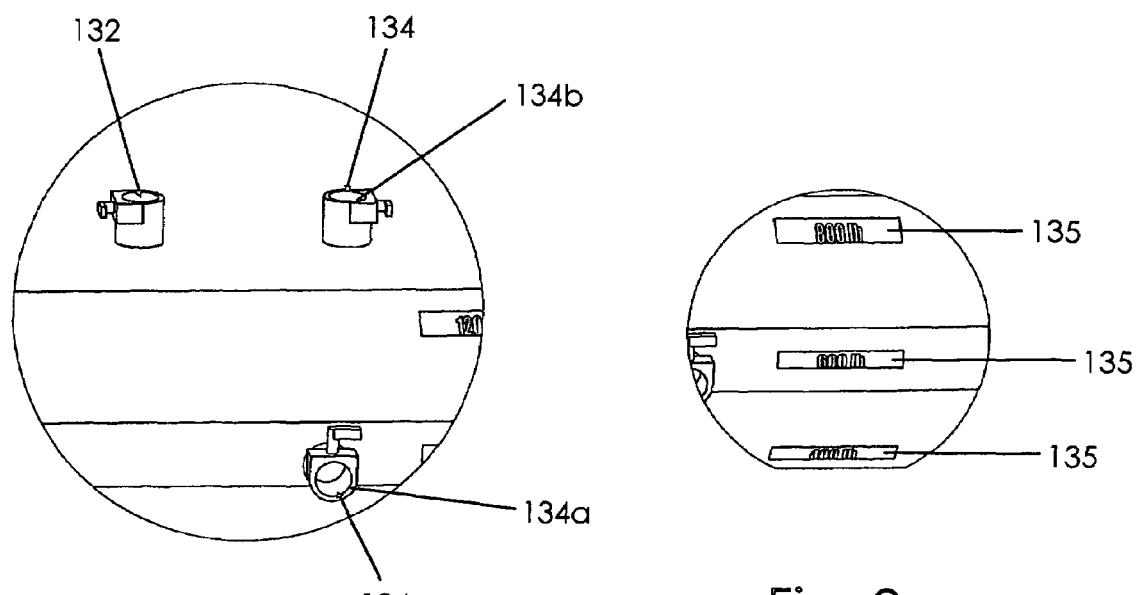
Fig. 2b
Fig. 2c

AUTOMOBILE BALLAST DEVICE

BACKGROUND OF THE INVENTION

The present invention relates generally to ballast devices and, more particularly, to an automobile ballast device in which a bladder may be filled with variable amounts of water and surrounded by panels of interlocking members for protection.

In climates and environments where ice and snow are common during the winter months, maintaining sufficient traction while driving an automobile is a significant challenge. Adding weight to the vehicle so that the wheels and tires are pressed more firmly against a slippery road surface helps improve driving conditions and reduce slippage. To that end, it has been known to place sandbags or other heavy objects in a truck bed or trunk of a vehicle.

Various devices have been proposed in the art for more user friendly ballast devices for a truck bed or car trunk. Although assumably effective for their intended purposes, the existing devices and proposals do not provide a user with a visual indicator of how much ballast and how much weight is in the device. Further, the existing devices do not provide interlocking protective panels surrounding a variably sized bladder or recessed panel handles.

Therefore, it would be desirable to have an automobile ballast device having a bladder that may be filled with selected levels of water corresponding to respective visual weight indicating markings. Further, it is desirable to have an automobile ballast device in which the bladder is sandwiched between interlocking panels for protection.

SUMMARY OF THE INVENTION

Accordingly, an automobile ballast device according to the present invention includes a bladder member configured to hold various amounts of matter (such as water) and having an inlet for selectively allowing the matter to enter the bladder member. The automobile ballast device further includes a plurality of lower panels configured to collectively form a unitary platform below the bladder member, each lower panel having an interlocking member complementary to an interlocking member of another respective lower panel. Similarly, the automobile ballast device includes a plurality of upper panels configured to collectively form a unitary platform atop the bladder member, each upper panel having an interlocking member complementary to an interlocking member of another respective upper panel.

At least one of the upper panels includes an access door for selectively allowing access to the bladder member inlet. The access door includes a recessing handle that is movable between extended and generally flush configurations. The invention also includes a plurality of spacers, each spacer being coupled to a respective lower panel and to a respective upper panel for maintaining a selected distance between upper and lower panels. Each spacer includes indicia indicative of a volume of ballast matter, a corresponding weight, or the like.

Therefore, a general object of this invention is to provide an automobile ballast device for selectively increasing the weight of a vehicle and enhancing traction in icy road conditions.

Another object of this invention is to provide an automobile ballast device, as aforesaid, having a bladder that may be filled with a selective amount of ballast matter.

Still another object of this invention is to provide an automobile ballast device, as aforesaid, having upper and lower protective panels that sandwich and protect the bladder from damage.

Yet another object of this invention is to provide an automobile ballast device, as aforesaid, which includes visual indicators of the volume or weight of matter in the bladder.

A further object of this invention is to provide an automobile ballast device, as aforesaid, having spacers that may be positioned between upper and lower panels for determining and maintaining the distance between respective panels.

A still further object of this invention is to provide an automobile ballast device, as aforesaid, that is economical to manufacture and user-friendly to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2a is a isolated perspective view of a bladder removed from the ballast device as in FIG. 1;

FIG. 2b is an isolated view on an enlarged scale of a portion of the bladder member taken from FIG. 2a;

FIG. 2c is another isolated view on an enlarged scale of a portion of the bladder member taken from FIG. 2a;

FIG. 3c is an isolated view on an enlarged scale of a portion of the ballast device taken from FIG. 3a;

FIG. 3d is another isolated view on an enlarged scale of a portion of the ballast device taken from FIG. 3b;

FIG. 5 is an isolated view on an enlarged scale taken from a portion of FIG. 4a.

DESCRIPTION OF THE PREFERRED EMBODIMENT

An automobile ballast device 100 according to the present invention will now be described in detail with reference to FIGS. 1 through 5 of the accompanying drawings. More particularly, an automobile ballast device 100 according to the current invention includes a plurality of interlocking lower panels 110, a plurality of interlocking upper panels 120, and a bladder member 130.

Figure 1:
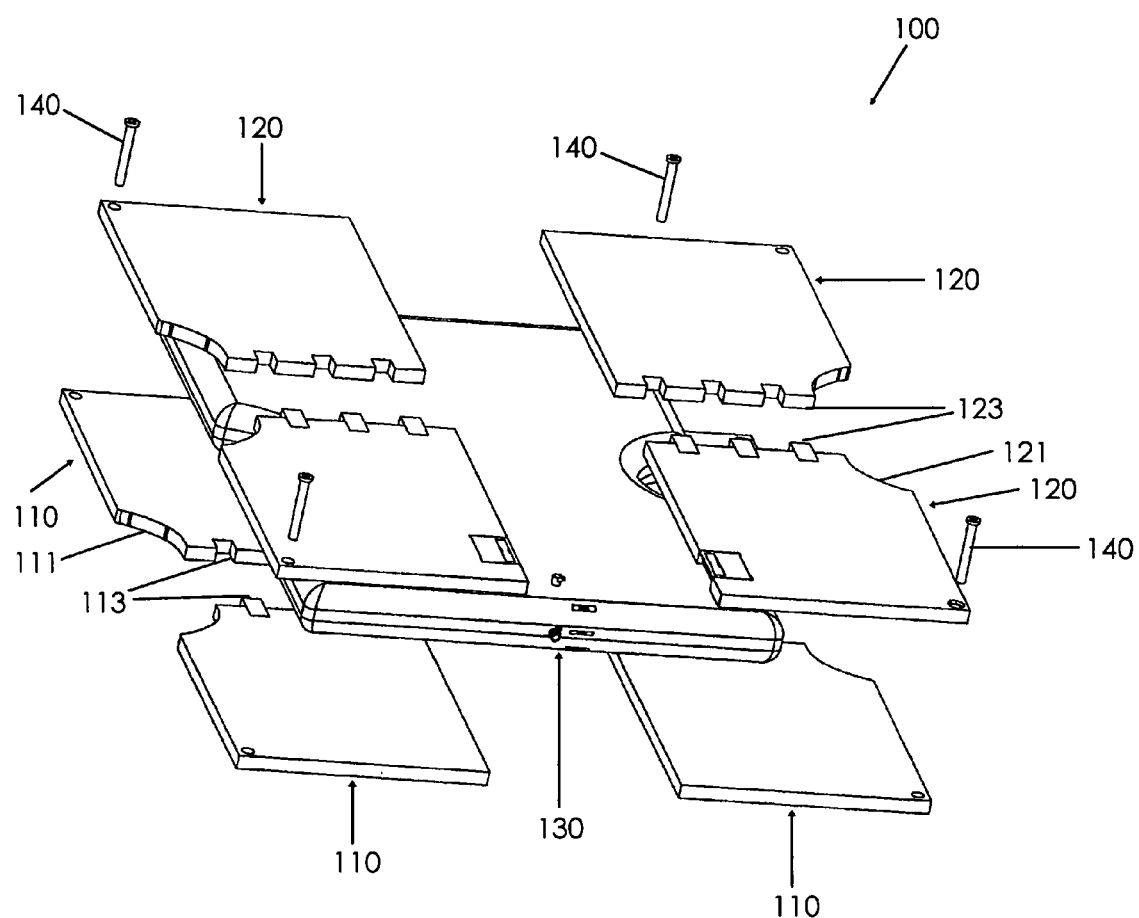
FIG. 1 is an exploded view of an automobile ballast device according to a preferred embodiment of the present invention.
Figures 3A, 3B:
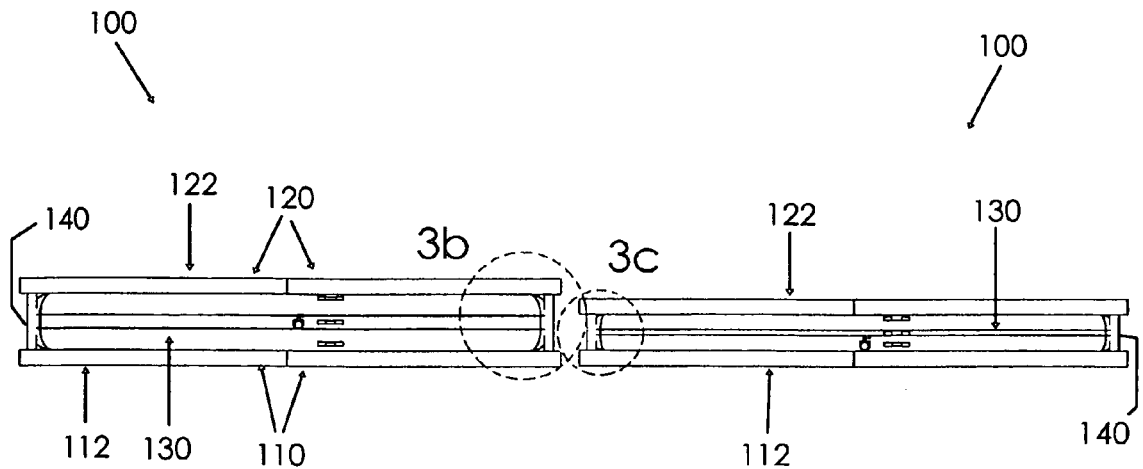
FIG. 3a is a side view of the automobile ballast device according to the preferred embodiment of the present invention.
FIG. 3b is another side view of the automobile ballast device according to the preferred embodiment of the present invention.

As shown in FIGS. 1 and 3a, the lower panels 110 are configured to collectively form a unitary lower platform 112 (FIG. 3a) below the bladder member 130. Each lower panel 110 may have an interlocking member 113 that is complementary to an interlocking member 113 of another respective lower panel 110 (FIG. 1). While FIG. 1 shows only one side of the lower panels 110 having interlocking members 113, two or more sides of the lower panels 110 may have interlocking members 113. The lower panels 110 may be provided as a set, and some or all of the panels 110 in the set may be used to form the lower platform 112, depending on the size and shape of the desired lower platform 112. Relatively more lower panels 110 may be used to form a relatively larger lower platform 112, while relatively fewer lower panels 110 may be used to form a relatively smaller lower platform 112. The lower platform 112 may be shaped to fit inside a truck bed (e.g., to include wheel well cutouts 111) or a car trunk, for example, and platform size may correspond to truck bed size, for example.

Figures 4A, 4B:
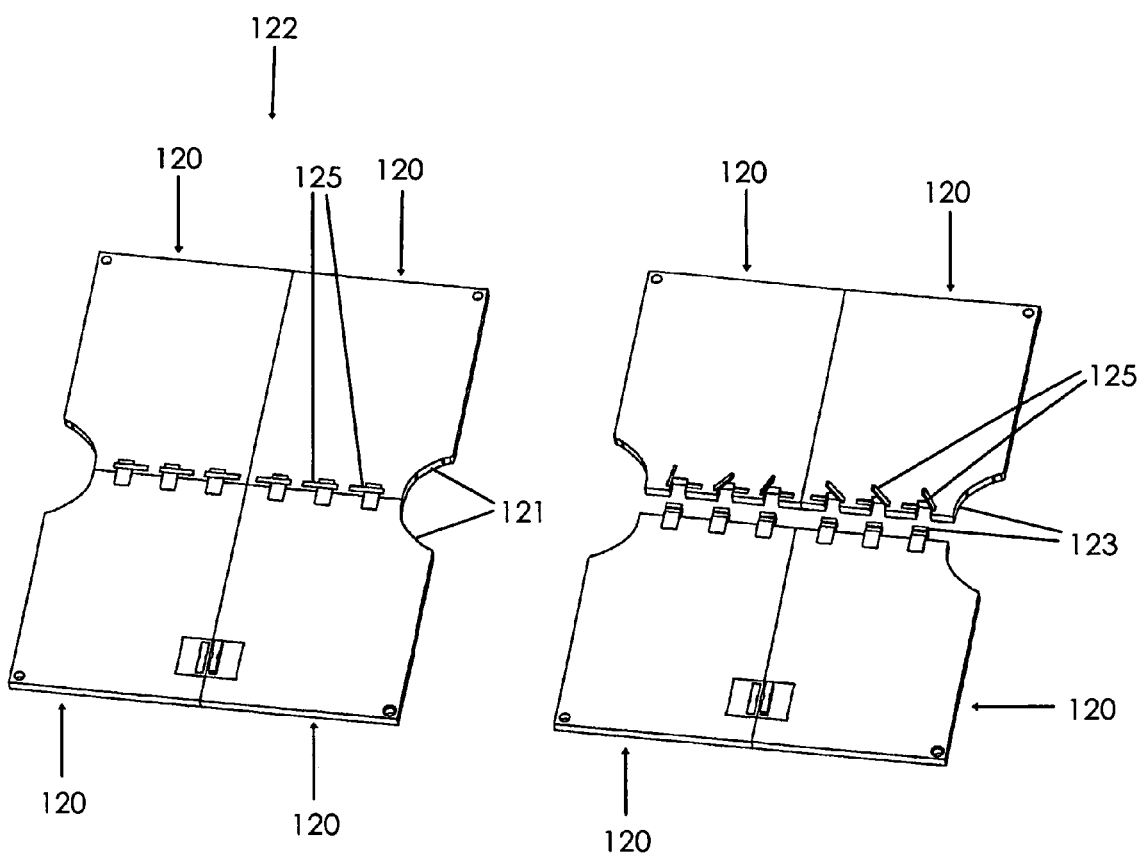
FIG. 4a is a perspective view of a unitary upper panel of the automobile ballast member with respective upper panels in a interlocked configuration.
FIG. 4b is a perspective view of the unitary upper panel as in FIG. 4a with respective uppers panels in an unlocked configuration.

As shown in FIGS. 1 and 3a, the upper panels 120 are configured to collectively form a unitary upper platform 122 (FIG. 3a) atop the bladder member 130. Each upper panel 120 may have an interlocking member 123 that is complementary to an interlocking member 123 of another respective upper panel 120 (FIG. 1). While FIG. 1 shows only one side of the upper panels 120 having interlocking members 123, two or more sides of the upper panels 120 may have interlocking member 123. As shown in FIGS. 4a and 4b, one or more lock 125 may further fasten a respective interlocking member 123 of one upper panel 120 to a respective interlocking member 123 of another upper panel 120. FIG. 4a shows the locks 125 fastening the upper panels 120 together; FIG. 4b shows the locks 125 in a free configuration that may allow the upper panels 120 to be separated. Though not shown in the drawings, the lower panels 110 may additionally or alternately include lock(s) 125 to further fasten respective lower panels 110 together.

The upper panels 120 may be provided as a set, and some or all of the panels 120 in the set may be used to form the upper platform 122, depending on the size and shape of the desired upper platform 122. Relatively more upper panels 120 may be used to form a relatively larger upper platform 122, while relatively fewer upper panels 120 may be used to form a relatively smaller upper platform 122. The upper platform 122 may be shaped to fit inside a truck bed (e.g., to include wheel well cutouts 121) or a car trunk, for example, and platform size may correspond to truck bed size, for example.

Figure 5:
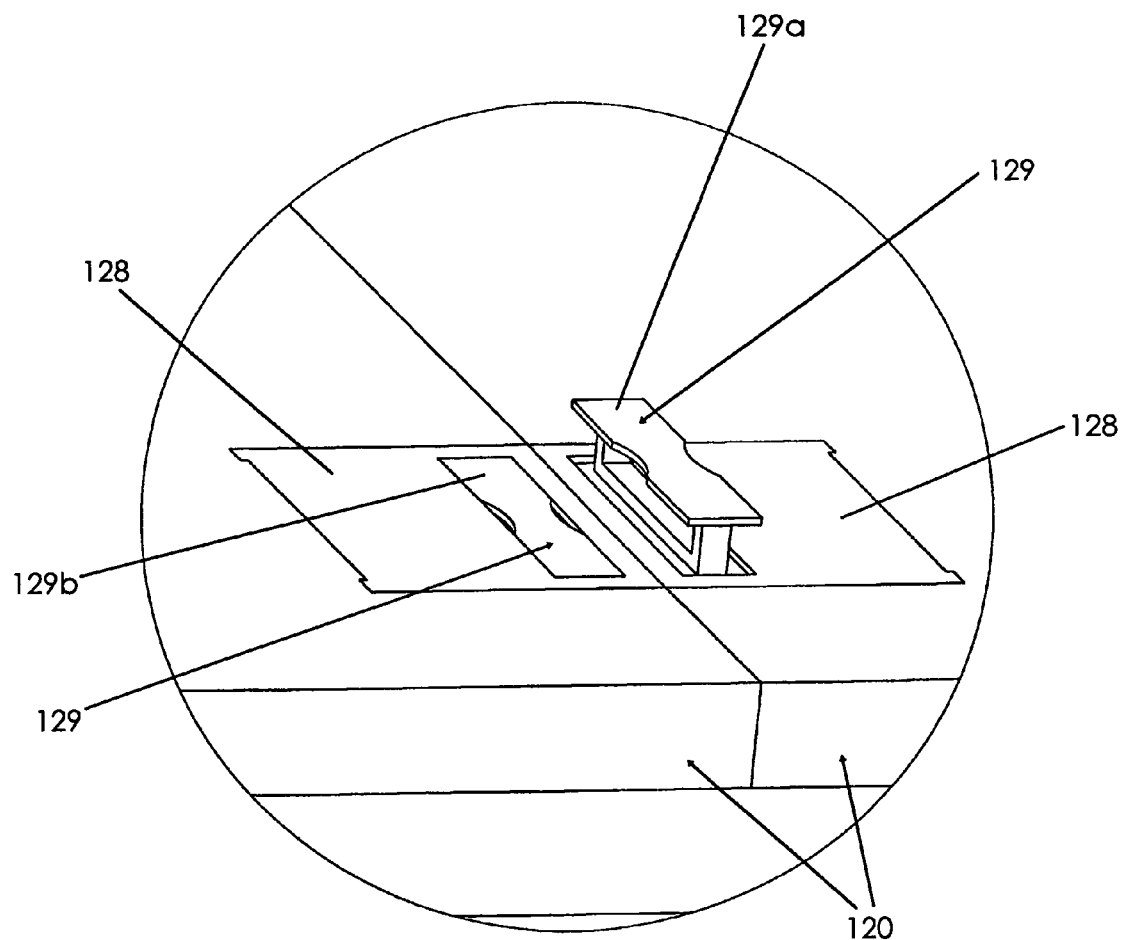

The bladder member 130 is best shown in FIGS. 2a through 2c and is configured to hold various amounts of matter (e.g., water, antifreeze, liquid solutions/mixtures, sand, etc.). The bladder member 130 may be configured to be received in a truck bed (not shown). In other words, the bladder member 130 may be sized and/or shaped (e.g., to include wheel well cutouts 131) to fit inside a truck bed. The bladder member 130 may include an inlet 132 for selectively allowing the matter to enter the bladder member 130 and an outlet 134 for selectively allowing the matter and/or air to exit the bladder member 130. The bladder member 130 shown in FIG. 2b has a first outlet 134a for selectively allowing the matter to exit the bladder member 130 and a second outlet 134b for selectively allowing air to exit the bladder member 130. It should be appreciated that any appropriate number of inlets 132 and outlets 134 may be used, and that the inlet 132 and the outlet 134 may even be a single port. One or more of the ports 132, 134 may include automatic valve shutoffs to prevent overflow. The bladder member 130 may be sandwiched between the upper and lower platforms 112, 122, as shown in FIGS. 1 and 3a. At least one upper panel 120 may include an access door 128 for selectively allowing access to the bladder member inlet 132 (FIGS. 4a through 5). The access door 128 may include a recessing handle 129 movable between extended and generally flush configurations 129a, 129b.

It should be appreciated that a manufacturer may include an additive to the ballast matter when the ballast matter is water. An appropriate additive may cause the water to maintain a frozen condition once it has been thoroughly frozen initially even if the surrounding ambient temperature reaches a temperature slightly above freezing. Ideally, the longer the ballast matter remains in a solid state the better the traction of the automobile. In other words, it is preferred that the ballast matter not shift side to side in a liquid state during operation of the automobile.

When sandwiched between the upper and lower platforms 112, 122 and positioned in an automobile (e.g., in a truck bed or a car trunk), the bladder member 130 may have a side that is visible to a user. The matter inside the bladder member 130 may be visible through the bladder member 130, or in other words, the bladder member 130 may be at least partially transparent. As shown in FIG. 2c, the side visible to the user may include indicia 135 that corresponds a volume of the matter inside the bladder member 130 to a mass of the matter inside the bladder member 130. For example, FIG. 2

Figures 3C, 3D:
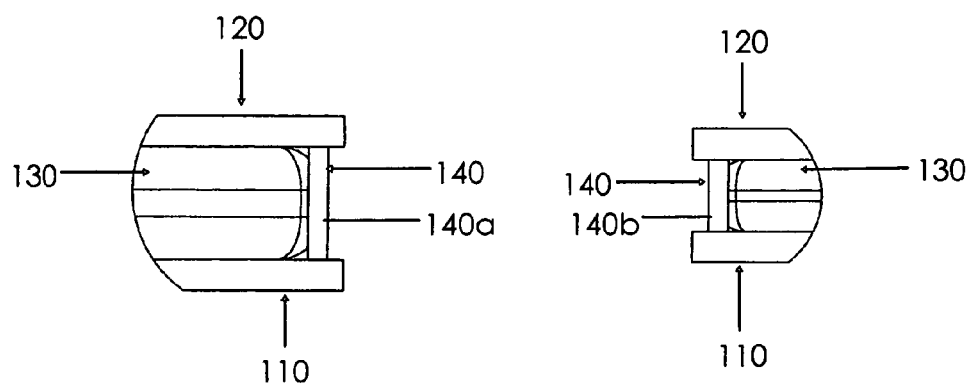

A plurality of spacers 140 may be coupled to respective lower and upper panels 110, 120 to maintain a selected distance between the lower and upper panels 110, 120 (FIGS. 1 and 3a through 3d). The selected distance between the lower and upper panels 110, 120 may be variable and may correspond to amounts of matter the bladder member 130 is capable of holding. To vary the distance, multiple sets of spacers 140 may be used. For example, a first set of spacers 140a may maintain a first preselected distance between the lower and upper panels 110, 120 (FIGS. 3a and 3c) while a second set of spacers 140b may maintain a second preselected distance between the lower and upper panels 110, 120 (FIGS. 3b and 3d). To quickly distinguish the spacers 140 in the first set from the spacers 140 in the second set, each spacer 140 in the first set may include first indicia (e.g., coloring, marking, etc.) while each spacer 140 in the second set includes second indicia (e.g., different coloring, marking, etc.). The first predetermined distance may correspond to a first volume of the matter that the bladder member 130 is capable of holding, and the second predetermined distance may correspond to a second volume of the matter that the bladder member 130 is capable of holding. If the matter has a known density, the density may be multiplied by the appropriate volume to determine the mass of the matter in the bladder member 130.

In use, the lower panels 110 may be coupled together to create the lower platform 112 using the interlocking members 113 as set forth above and placed in a truck bed or another appropriate place (e.g., a car trunk, etc.). The bladder member 130 may be placed atop the lower platform 112. The upper panels 120 may be coupled together atop the bladder member 130 to create the upper platform 122 using the interlocking members 123 and optionally the locks 125 as set forth above. Though not shown herein, hooks, straps, and/or other fasteners may be used to couple the lower platform 112, the bladder member 130, and/or the upper platform 122 to the automobile.

Spacers 140 may be coupled to the upper and lower panels 120, 110 to determine and maintain the distance between the upper and lower panels 120, 110 as set forth above. The access door(s) 128 may be opened using the recessing handle(s) 129 to provide access to the bladder member inlet 132, and the user may introduce matter into the bladder member 130 through the inlet 132. By filling the bladder member 130 with as much matter as the upper and lower platforms 122, 112 will allow considering the spacers 140, the mass in the bladder member 130 may be determined (as long as the density of the matter is known) by multiplying the matter's density by the volume allowed by the upper and lower platforms 122, 112. Mass of the matter inside the bladder member 130 may alternately or additionally be calculated by referencing the indicia 135 on the side of the bladder member 130; by correlating the volume of matter with the matter's density, mass may be determined. The upper platform 122 may act as a normal floor surface capable of holding items. While holding and supporting items may be facilitated by using a liquid that freezes easily or a solid such as sand inside the bladder member 130, other matter may alternately or additionally be used in the bladder member 130.

It should be appreciated that calculations set forth herein may be performed by a manufacturer and appropriate indicia setting forth the mass of various matter in relation to various volumes of the matter may be indicated to the user without requiring the user to perform any computations.

It is understood that while certain forms of this invention have been illustrated and described, it is not limited thereto except insofar as such limitations are included in the following claims and allowable functional equivalents thereof.

The invention claimed is:

1. An automobile ballast device, comprising:
a bladder member configured to hold various amounts of matter, said bladder member having an inlet for selectively allowing the matter to enter said bladder member and an outlet for selectively allowing at least one of the matter and air to exit said bladder member;
a plurality of lower panels configured to collectively form a unitary platform, each said lower panel having an interlocking member complementary to an interlocking member of another respective lower panel;
a plurality of upper panels configured to collectively form a unitary platform, each said upper panel having an interlocking member complementary to an interlocking member of another respective upper panel; and,
said bladder member overlaying at least two of said lower panels that are interlocked together and underlying at least two upper panels that are interlocked together, said bladder being sandwiched between said plurality of upper and lower panels.

2. The automobile ballast device as in claim 1, wherein said bladder member is configured to be received in a truck bed.

3. The automobile ballast device as in claim 1, wherein:
at least one upper panel includes an access door for selectively allowing access to said bladder member inlet; and
said access door includes a recessing handle movable between extended and generally flush configurations.

4. The automobile ballast device as in claim 1, further comprising a plurality of spacers, each spacer being coupled to a respective lower panel and a respective upper panel to maintain a selected distance between said upper and lower panels.

5. The automobile ballast device as in claim 4, wherein said selected distance between said upper and lower panels is variable and corresponds to amounts of the matter said bladder member is capable of holding.

6. The automobile ballast device as in claim 1, further comprising a first set of spacers and a second set of spacers; each spacer of said first set capable of being coupled to a respective lower panel and a respective upper panel to maintain a first predetermined distance between said upper and lower panels; each spacer of said second set capable of being coupled to a respective lower panel and a respective upper panel to maintain a second predetermined distance between said upper and lower panels.

7. The automobile ballast device as in claim 6, wherein each said spacer of said first set includes first indicia and each said spacer of said second set includes second indicia.

8. The automobile ballast device as in claim 1, wherein:
said bladder member has a side visible to a user;
the matter inside said bladder member is visible through said bladder member; and
said bladder member side includes indicia corresponding a volume of the matter inside said bladder member to a mass of the matter inside said bladder member.

9. The automobile ballast device as in claim 1, further comprising at least one lock to further fasten a respective interlocking member of one upper panel to a respective interlocking member of another upper panel.

10. A ballast device for placement in a truck bed, said device comprising:
a lower platform having a plurality of interlocking discrete lower panels;
an upper platform having a plurality of interlocking discrete upper panels; and
a bladder member configured to hold various amounts of matter, said bladder member having an inlet for selectively allowing the matter to enter said bladder member and an outlet for selectively allowing at least one of the matter and air to exit said bladder member, said bladder member overlaying at least two of said discrete lower panels that are interlocked together and underlying at least two of said discrete upper panels that are interlocked together, said bladder member being sandwiched between said upper and lower platforms.

11. The ballast device as in claim 10, further comprising a first set of spacers and a second set of spacers; each spacer of said first set capable of being coupled to a respective lower panel and a respective upper panel to maintain a first predetermined distance between said upper and lower panels; each spacer of said second set capable of being coupled to a respective lower panel and a respective upper panel to maintain a second predetermined distance between said upper and lower panels.

12. The ballast device as in claim 11, wherein:
said first predetermined distance corresponds to a first volume of the matter said bladder member is capable of holding; and
said second predetermined distance corresponds to a second volume of the matter said bladder member is capable of holding.

13. The ballast device as in claim 12, wherein:
said bladder member is at least partially transparent; and
a side of said bladder member includes indicia corresponding a volume of the matter inside said bladder member to a mass of the matter inside the bladder member.

14. The ballast device as in claim 13, further comprising at least one lock to further fasten one respective upper panel to another respective upper panel, and wherein:
at least one upper panel includes an access door for selectively allowing access to said bladder member inlet; and
said access door includes a recessing handle movable between extended and generally flush configurations.

15. The ballast device as in claim 10, wherein:
said bladder member is at least partially transparent; and
a side of said bladder member includes indicia corresponding a volume of the matter inside said bladder member to a mass of the matter inside the bladder member.

16. An automobile ballast device, comprising:
a set of interlocking upper panels, at least a plurality of said upper panels collectively forming a unitary upper platform configured to be received in a truck bed;
a set of interlocking lower panels, at least a plurality of said lower panels collectively forming a unitary lower platform configured to be received in the truck bed;

a bladder member configured to hold various amounts of matter, said bladder member having an inlet for selectively allowing the matter to enter said bladder member and an outlet for selectively allowing at least one of the matter and air to exit said bladder member, said bladder member overlaying at least two of said discrete lower panels that are interlocked together and underlying at least two of said discrete upper panels that are interlocked together, said bladder member being sandwiched between said upper and lower platforms;

wherein relatively more upper panels form said upper platform for said upper platform to be received in a relatively larger truck bed and wherein relatively fewer upper panels form said upper platform for said upper platform to be received in a relatively smaller truck bed; and wherein relatively more lower panels form said lower platform for said lower platform to be received in a relatively larger truck bed and wherein relatively fewer lower panels form said lower platform for said lower platform to be received in a relatively smaller truck bed.

17. The automobile ballast device as in claim 16, further comprising a first set of spacers and a second set of spacers; each spacer of said first set capable of being coupled to a respective lower panel and a respective upper panel to maintain a first predetermined distance between said upper and lower panels; each spacer of said second set capable of being coupled to a respective lower panel and a respective upper panel to maintain a second predetermined distance between said upper and lower panels.

18. The ballast device as in claim 17, wherein:
said first predetermined distance corresponds to a first volume of the matter said bladder member is capable of holding; and
said second predetermined distance corresponds to a second volume of the matter said bladder member is capable of holding.

19. The ballast device as in claim 18, further comprising at least one lock to further fasten one respective upper panel to another respective upper panel, and wherein:
at least one upper panel includes an access door for selectively allowing access to said bladder member inlet;
said access door includes a recessing handle movable between extended and generally flush configurations;
said bladder member is at least partially transparent; and
a side of said bladder member includes indicia corresponding a volume of the matter inside said bladder member to a mass of the matter inside the bladder member.

20. The ballast device as in claim 16, wherein:
said bladder member is at least partially transparent; and
a side of said bladder member includes indicia corresponding a volume of the matter inside said bladder member to a mass of the matter inside the bladder member.

\* \* \* \* \*